May 26, 1959
F. M. BROWER
2,888,386
METHOD OF DISTILLING VINYLTOLUENE
Filed Feb. 2, 1956
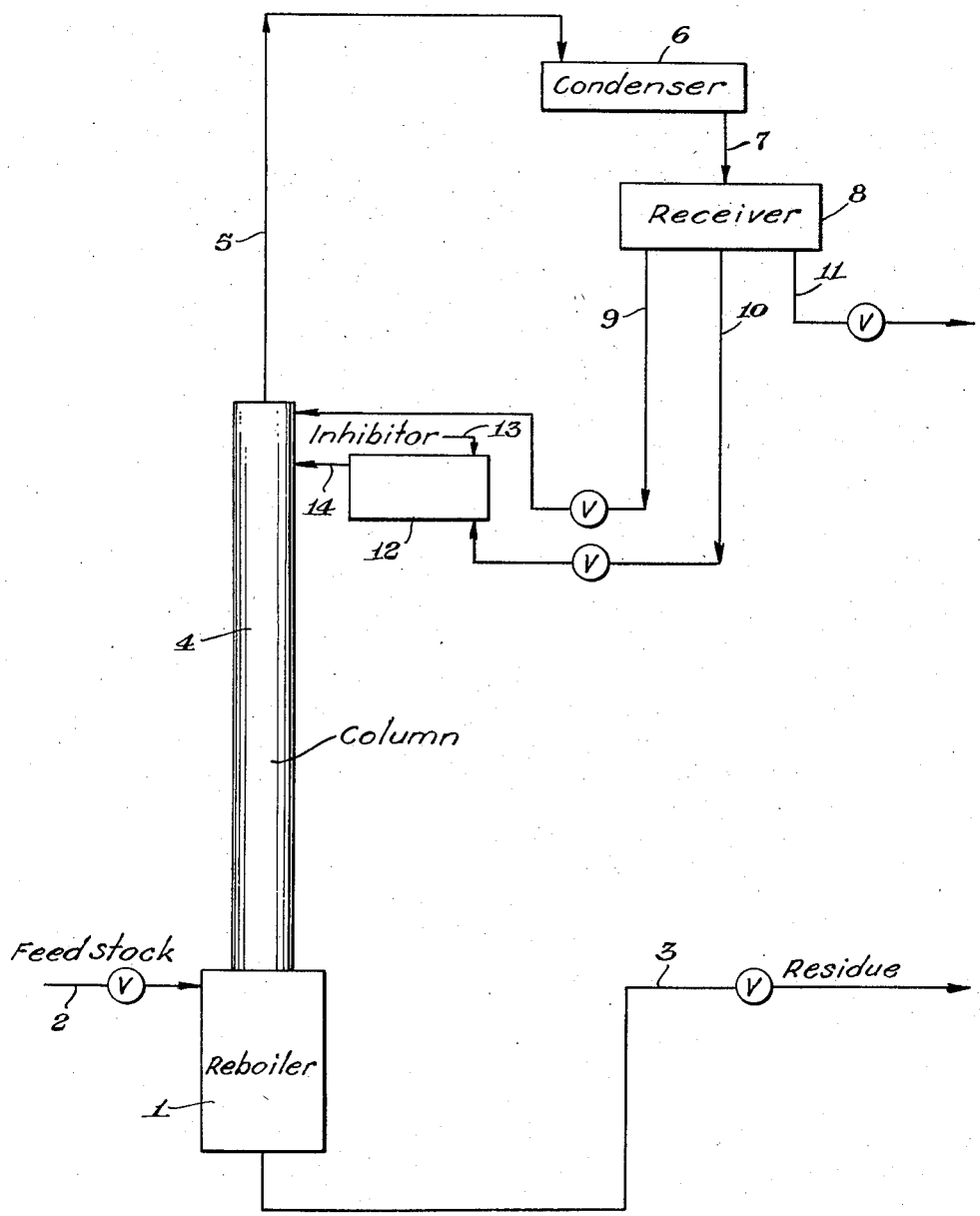
INVENTOR.
Frank M. Brower
BY
Griswold & Burdick
ATTORNEYS

United States Patent Office 2,888,386
Patented May 26, 1959

2,888,386

METHOD OF DISTILLING VINYLTOLUENE

Frank M. Brower, Midland, Mich., assignor to The Dow Chemical Company, Midland, Mich., a corporation of Delaware Application February 2, 1956, Serial No. 562,987

7 Claims. (Cl. 202—57)

This invention relates to the manufacture of vinyltoluene. It pertains especially to a method and agents for inhibiting the formation of proliferous polymer in the distillation of a vinyl aromatic feed stock containing vinyltoluene and divinylbenzene to recover the vinyltoluene.

Vinyltoluene is commonly prepared by the thermal dehydrogenation of ethyltoluene, cooling of the cracked gaseous materials to condense and separate liquid product from the permanent gases, e.g. hydrogen, and fractionally distilling the liquid product to obtain vinyltoluene.

In the manufacture of vinyltoluene by the thermal dehydrogenation of ethyltoluene considerable difficulty has been experienced in distilling the cracked liquid product to obtain vinyltoluene because of the formation of proliferous polymer. The formation of polymeric material not only results in lowered yields of vinyltoluene, but the proliferous polymer is insoluble in the monomer and usual solvents for polyvinyltoluene such as benzene, toluene, xylene, ethyltoluene, chlorobenzene or ortho-dichlorobenzene and cannot be dissolved in such solvents and washed from a column. The proliferous or "popcorn" polymer appears to be a copolymer of vinyltoluene with trace amounts of divinylbenzene in the liquid dehydrogenation product. Such polymer tends to adhere to walls or surfaces of a distilling column or vessel and has a tendency to grow or increase in bulk. Even small quantities, e.g. as little as 0.001 percent, on a weight basis, adhering to surfaces in a distilling column serve to seed the formation of such polymer in subsequent distillations with resultant gradual restricting or even complete plugging of the column. These and other difficulties have in the past, necessitated frequent dismantling of the distillation column for cleanout and repair.

It will be evident from the description just given that the proliferous polymer is different in properties from the ordinary transparent polymers and copolymers of vinyl aromatic compounds. The proliferous polymer is opaque and is insoluble in, and not more than slightly swollen by, benzene, toluene, xylene, chlorobenzene, carbon tetrachloride and other usual organic liquids. In contrast, polystyrene and the polymers composed of other monovinyl aromatic compounds are soluble in such solvents. A proliferous polymer is usually more resistant to the solvent- or swelling-action of such an organic liquid than is a transparent polymer of the same monomeric starting material. Many agents that are effective in inhibiting formation of the transparent polymers are not satisfactorily effective as inhibitors against formation of the opaque, proliferous polymer, especially when a seed of the latter is present. For these reasons, the tendency toward formation of a proliferous polymer during distillation of a dehydrogenated ethyltoluene mixture to separate the vinyltoluene product, constitutes a more serious and troublesome problem than if the polymer that tended to form were entirely of the transparent, benzene-soluble type.

It has been proposed to prevent the polymerization of styrene and various substituted styrenes as well as other polymerizable vinyl compounds by the use of inhibitors. However, many of the compounds, e.g. tertiary butyl catechol, hydroquinone, dinitro-ortho-cresol, etc., heretofore proposed for preventing the formation of polymeric material when styrene or substituted styrenes are stored in bulk, or when styrene is distilled, are ineffective to prevent the formation of proliferous polymer when distilling an aromatic feed stock containing vinyltoluene and a small proportion of divinylbenzene.

It is an object of the invention to provide a method and agents for inhibiting the formation of proliferous polymer when distilling an aromatic feed stock containing vinyltoluene and a small proportion of divinylbenzene, prepared by the thermal dehydrogenation of ethyltoluene, to obtain vinyltoluene. Another object is to provide a method of distilling a vinyltoluene feed stock containing divinylbenzene in the presence of certain agents which prevent, or inhibit, the formation of proliferous polymer so as to obtain vinyltoluene of high purity as distillate which is free or substantially free from divinylbenzene and said agents. A further object is to provide agents for preventing the formation of proliferous polymer on surfaces in contact with vapors of vinyltoluene and divinylbenzene when subjecting a vinyltoluene feed stock containing divinylbenzene to fractional distillation. Other and related objects may appear from the following description of the invention.

According to the invention the formation of proliferous polymer can be inhibited or entirely prevented when distilling a vinyltoluene feed stock prepared by the thermal dehydrogenation of ethyltoluene and containing a small proportion of divinylbenzene by subjecting the feed stock to fractional distillation in the presence of a small but effective amount, e.g. from 0.01 to 0.1 percent by weight, of 2-nitrophenol or 2-nitrothiophene or a mixture of 2-nitrophenol and 2-nitrothiophene.

The invention is illustrated more particularly with reference to the drawing.

The drawing illustrates one of the various arrangements of the principal major elements of an apparatus which may be employed in practicing the invention. In the drawing the numeral 1 indicates a reboiler or still pot having a valved inlet 2 for feed of material thereto and a valved outlet 3 for the withdrawal of bottoms or residue. The reboiler 1 is attached to a column 4. A vapor line 5 leads from the top of column 4 and connects to condenser 6 from which a conduit 7 for the condensate connects to receiver 8. Receiver 8 is elevated above the top of column 4 to permit gravity flow of liquid from the receiver to the column and is provided with valved outlet pipes 9, 10 and 11 which serve to divide the flow of condensate. Pipe 9 leads to the top section of column 4 for the return of condensate thereto. Pipe 10 also adapted for the return of condensate is connected to a vessel 12 to which the inhibiting agent, i.e. 2-nitrophenol or 2-nitrothiophene, is added through inlet pipe 13. A conduit 14 connects vessel 12 with column 4. Pipe 11 is used to withdraw condensate from the system.

In the operation of such apparatus, a vinyltoluene feed stock, suitably a vinyltoluene fraction prepared by the dehydrogenation of ethyltoluene, which preferably though not necessarily contains an agent effective for inhibiting its polymerization, is fed into reboiler or still pot 1. The distillation is carried out in conventional manner, a portion of the distillate being returned to the column 4 via pipe 9 and via pipe 10, vessel 12 and conduit 14, together with the inhibiting agent in the desired proportion, while withdrawing distillate through pipe 11, withdrawing residue or bottoms through pipe 3 and feeding the vinyltoluene feed stock into the reboiler 1 through inlet pipe 2, all in continuous manner.

The distillation can be carried out at absolute pressures of up to atmospheric pressure or thereabout, preferably at from 20 to 200 millimeters absolute pressure, and in usual distillation apparatus such as in combination a still pot, a fractionating column and a condenser with take off and reflux return to the fractionating column. The distillation can be carried out batchwise or in continuous manner. The drawing illustrates an arrangement of the principal major elements of an apparatus suitable for carrying out the distillation in continuous manner.

The 2-nitrophenol or 2-nitrothiophene inhibiting agent can be added to the still pot, mixed with the feed stock, added to the reflux or fed to the fractionating column at any desired section. Best results are usually obtained by feeding the inhibiting agent, suitably mixed with vinyltoluene or at least a portion of the feed stock, into the fractionating column and at a point at least as high as that reached by the divinylbenzene, preferably at a point higher than that reached by divinylbenzene in the distilling column or fractionating zone and below the point of take off of vinyltoluene as distillate, in order to maintain the mixture of the vapors of the vinyltoluene and the divinylbenzene in the fractionating zone in the presence of the inhibiting agent which is effective in preventing the formation of proliferous polymer, and to obtain vinyltoluene as distillate which is free or substantially free from said agent and from divinylbenzene.

The proportion of the 2-nitrophenol or 2-nitrothiophene inhibiting agent to be employed in the distillation of a feed stock comprising vinyltoluene, together with a small amount of divinylbenzene, will vary somewhat depending upon the conditions of temperature and pressure at which the distillation is carried out and upon the relative proportion of divinylbenzene in the feed stock. In general an amount of the inhibiting agent corresponding to from 0.01 to 0.1, preferably from 0.01 to 0.04, percent by weight of the vinyltoluene feed stock fed to the distillation, is satisfactory. The inhibitor can be used in as large a proportion as desired.

The following examples illustrate ways in which the principle of the invention has been applied, but are not to be construed as limiting its scope.

EXAMPLE 1

In each of a series of experiments, a vinyltoluene fraction containing 99.3 percent by weight of vinyltoluenes (approximately 65 percent meta-vinyltoluene and 35 percent para-vinyltoluene) and 0.7 percent of divinylbenzene was fractionally distilled in continuous manner by feeding the fraction into a glass still pot connected to a 3-inch diameter glass column 4 feet long packed with 0.25-inch ceramic saddles and equipped with a conventional still head and reflux condenser. The distillation was carried out by feeding the vinyltoluene fraction containing ortho-nitrophenol, added in amount as stated in the following table, into the still pot at a rate corresponding to 500 cc. of the vinyltoluene fraction per hour. Distillate was withdrawn at a rate of 450 cc. per hour. Bottoms were withdrawn from the still pot at a rate of 50 cc. per hour. The column was operated so that the vinyltoluene was distilled at a temperature of about 65° C. at 20 millimeters absolute pressure employing a reflux to take-off ratio of 3:1. In each experiment the still was operated until the formation of popcorn or proliferous polymer prevented distillation or if no popcorn polymer formed, until the effectiveness of the inhibitor was demonstrated. Table I identifies the experiments and gives the proportions of vinyltoluene and divinylbenzene in the feed stock. The table also gives the proportion of ortho-nitrophenol in percent by weight, added as inhibitor to the feed stock, and the period of time for which the still was operated.

Table I

| Run No. | Feed Stock | | Inhibitor added | | Distillation | |
|---|---|---|---|---|---|---|
| | Vinyltoluene, percent | Divinylbenzene, percent | Kind | Percent | Time, Hrs. | Remarks |
| 1 | 99.3 | 0.7 | none | 0.0 | 37 | Popcorn polymer plugged still. |
| 2 | 99.3 | 0.7 | o-nitrophenol | 0.02 | 603 | no polymer. |
| 3 | 99.3 | 0.7 | ___do___ | 0.01 | 336 | Do. |

The vinyltoluene obtained as distillate in the experiments was of high purity and contained only 0.0028 percent of divinylbenzene by analysis.

EXAMPLE 2

A portion of a batch of a vinyltoluene fraction containing 98.5 percent by weight of a mixture of about 65 percent by weight of meta-vinyltoluene and 35 percent of paravinyltoluene and 1.5 percent of divinylbenzene, together with 0.2 percent of dinitro-ortho-cresol as polymerization inhibitor, based on the weight of the fraction, was fractionally distilled in the presence of 0.04 percent by weight of ortho-nitrothiophene as popcorn polymerization inhibitor employing a procedure similar to that employed in Example 1. The ortho-nitrothiophene was dissolved in the vinyltoluene fraction, i.e. the feed stock, prior to feeding the same into the still pot. The distillation was carried out continuously over a period of 364 hours. No popcorn polymer was formed.

In contrast, when another portion of the vinyltoluene fraction containing the 0.2 percent by weight of dinitro-ortho-cresol was distilled in similar manner in the absence of any other added inhibitor, the formation of popcorn polymer completely plugged the still column after only 18 hours of operating.

EXAMPLE 3

An arrangement of apparatus similar to that shown in the drawing and comprising a reboiler attached to a carbon steel column 12-inches in diameter by 26 feet long filled with 1-inch ceramic saddles was employed for the distillation of a vinyltoluene feed stock prepared by the dehydrogenation of ethyltoluene. The vinyltoluene feed stock varied in composition somewhat from day to day and contained between 0.23 and 0.7 percent by weight of divinylbenzene by analysis, and approximately 0.2 percent of dinitro-ortho-cresol as polymerization inhibitor. The distillation was carried out in continuous manner by feeding the vinyltoluene feed stock into the reboiler at a rate of 160 pounds per hour and operating the column so that vinyltoluene boiling at temperatures between 110° and 130° C. at 85 to 95 millimeters absolute pressure was withdrawn as distillate employing a reflux ratio of 3:1, while feeding 2-nitrophenol dissolved in a small amount of the distillate into the column at a point 8 feet below the top and in amount corresponding to 0.04 percent by weight of the feed stock fed to the reboiler. Distillate was withdrawn at a rate of about 158.5 pounds per hour. Bottoms or residue was withdrawn from the reboiler at a rate of about 1.5 pounds per hour. The distillation was carried out continuously over a period of 31 days without any apparent formation of proliferous polymer. The vinyltoluene obtained in the distillation was of high purity. It contained 0.0028 percent by weight of divinylbenzene and 0.0001 percent of 2-nitrophenol by analysis.

In contrast, when a similar vinyltoluene feed stock was distilled through the column while adding 0.02 percent by weight of tertiary butyl catechol as polymerization inhibitor to the reflux, the column became completely plugged with proliferous polymer at a point 7 feet above the bottom after only 40 hours of operation.

I claim:
1. A process for separating purified vinyltoluene from the reaction products of the dehydrogenation of ethyltoluene wherein the reaction product comprising vinyltoluene, together with a small proportion of divinylbenzene, is subjected to fractional distillation to obtain vinyltoluene, which process comprises carrying out the distillation in a fractionation zone in the presence of a small proportion of at least one inhibiting agent selected from the group consisting of 2-nitrophenol and 2-nitrothiophene, and separating vinyltoluene as distillate substantially free from divinylbenzene and said inhibiting agent from the fractionation zone.

2. A method as claimed in claim 1, wherein the inhibiting agent is 2-nitrophenol.

3. A method as claimed in claim 1, wherein the inhibiting agent is 2-nitrothiophene.

4. A method as claimed in claim 1, wherein the inhibiting agent is employed in amount corresponding to from 0.01 to 0.1 percent by weight of the vinyl aromatic feed stock and the distillation is carried out at from 10 to 200 millimeters absolute pressure.

5. A process for separating purified vinyltoluene from the reaction products of the dehydrogenation of ethyltoluene wherein the reaction product comprising vinyltoluene, together with a small proportion of divinylbenzene, is subjected to fractional distillation to obtain vinyltoluene, which process comprises continuously feeding the reaction product into a fractionation zone wherein the distillation is being conducted at absolute pressures between 10 and 200 millimeters in the presence of from 0.01 to 0.1 percent by weight of at least one inhibiting agent selected from the group consisting of 2-nitrophenol and 2-nitrothiophene, also introduced continuously into said fractionation zone, continuously withdrawing vinyltoluene as distillate substantially free from divinylbenzene and said inhibiting agent from the fractionation zone and continuously withdrawing residue containing divinylbenzene from a different section of the fractionation zone.

6. A method as claimed in claim 5 wherein the inhibiting agent is 2-nitrophenol.

7. A method as claimed in claim 5, wherein the inhibiting agent is 2-nitrothiophene.

References Cited in the file of this patent

UNITED STATES PATENTS

| | | |
|---|---|---|
| 2,304,728 | Boyer et al. | Dec. 8, 1942 |
| 2,526,567 | Drake | Oct. 17, 1950 |
| 2,556,030 | Coulter | June 5, 1951 |

OTHER REFERENCES

"Chemical Abstracts," vol. 38, page 724–(6), March 1934.